United States Patent
Miller et al.

(10) Patent No.: US 11,360,765 B2
(45) Date of Patent: Jun. 14, 2022

(54) METADATA DRIVEN SERVERLESS FUNCTIONS IN A MULTITENANT ENVIRONMENT

(71) Applicant: salesforce.com, inc., San Francisco, CA (US)

(72) Inventors: Michael Dwayne Miller, San Rafael, CA (US); Andrew Fawcett, Montara, CA (US); Christopher Wall, Denver, CO (US); Jeffrey Michael Bartolotta, Concord, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/865,184

(22) Filed: May 1, 2020

(65) Prior Publication Data
US 2021/0342145 A1 Nov. 4, 2021

(51) Int. Cl.
*G06F 8/76* (2018.01)
*G06F 8/60* (2018.01)
*G06F 9/54* (2006.01)

(52) U.S. Cl.
CPC .............. *G06F 8/76* (2013.01); *G06F 8/60* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 7,275,098 B1* | 9/2007 | Becher | G06F 3/0607 |
| | | | 709/223 |
| 7,730,478 B2 | 6/2010 | Weissman | |
| 9,858,187 B2 | 1/2018 | Sundaravaradan et al. | |
| 9,934,019 B1* | 4/2018 | Gebhard | G06F 9/5072 |
| 9,984,002 B2 | 5/2018 | Sundaravaradan et al. | |
| 9,990,400 B2 | 6/2018 | Sundaravaradan et al. | |
| 10,007,491 B2* | 6/2018 | Bevilacqua | G06F 9/546 |
| 10,013,501 B2 | 7/2018 | Sundaravaradan et al. | |
| 10,459,718 B2 | 10/2019 | Miller et al. | |
| 10,481,898 B2 | 11/2019 | Advani et al. | |
| 10,489,139 B2 | 11/2019 | Bartolotta et al. | |
| 10,491,664 B2 | 11/2019 | Tan et al. | |
| 10,515,013 B2 | 12/2019 | Hua et al. | |
| 10,581,675 B1* | 3/2020 | Iyer | G06F 8/71 |

(Continued)

OTHER PUBLICATIONS

Nastic, S. and S. Dustdar. "Towards Deviceless Edge Computing: Challenges, Design Aspects, and Models for Serverless Paradigm at the Edge." The Essence of Software Engineering (2018), pp. 121-136. (Year: 2018).*

(Continued)

*Primary Examiner* — Andrew M. Lyons
(74) *Attorney, Agent, or Firm* — Nicholson, De Vos, Webster & Elliott, LLP (57) ABSTRACT

A method and system for deploying a function in a polyglot serverless elastic runtime execution environment includes receiving function code via a development environment, combining the function code with middleware layers for polyglot serverless elastic runtime execution environment to form an executable function for the polyglot serverless elastic runtime execution environment, and deploying the executable function to the polyglot serverless elastic runtime execution environment.

17 Claims, 5 Drawing Sheets

(56) References Cited

U.S. PATENT DOCUMENTS

| | | | |
|---|---|---|---|
| 2007/0168913 A1* | 7/2007 | Sarukkai | G06F 11/3476 717/101 |
| 2010/0228683 A1* | 9/2010 | Ansley | G06Q 10/067 705/348 |
| 2011/0161913 A1* | 6/2011 | Garimella | G06F 8/60 717/101 |
| 2013/0145351 A1* | 6/2013 | Tun | G06F 9/451 717/135 |
| 2014/0157262 A1* | 6/2014 | Hicks | G06F 9/45537 718/1 |
| 2016/0162128 A1 | 6/2016 | Hansen et al. | |
| 2018/0060066 A1* | 3/2018 | Rihani | G06F 8/71 |
| 2018/0129588 A1 | 5/2018 | Wunderlich et al. | |
| 2018/0157472 A1* | 6/2018 | Chen | H04L 41/0806 |
| 2018/0210727 A1 | 7/2018 | Elliott et al. | |
| 2018/0278721 A1 | 9/2018 | Wall | |
| 2019/0163459 A1* | 5/2019 | Sreenivasa | G06F 8/71 |
| 2019/0220608 A1 | 7/2019 | Mathrubootham et al. | |
| 2019/0235852 A1 | 8/2019 | Bartolotta et al. | |
| 2019/0236292 A1 | 8/2019 | Bartolotta et al. | |
| 2020/0042310 A1 | 2/2020 | Advani et al. | |

OTHER PUBLICATIONS

J. Keznikl, M. Malohlava, T. Bures and P. Hnetynka, "Extensible Polyglot Programming Support in Existing Component Frameworks," 2011 37th EUROMICRO Conference on Software Engineering and Advanced Applications, 2011, pp. 107-115, doi: 10.1109/SEAA.2011.25. (Year: 2011).*

A. Mujezinović and V. Ljubović, "Serverless architecture for workflow scheduling with unconstrained execution environment," 2019 42nd International Convention on Information and Communication Technology, Electronics and Microelectronics (MIPRO), 2019, pp. 242-246, doi: 10.23919/MIPRO.2019.8756833. (Year: 2019).*

* cited by examiner

METADATA DRIVEN SERVERLESS FUNCTIONS IN A MULTITENANT ENVIRONMENT

TECHNICAL FIELD

One or more implementations relate to the field of serverless functions in a multi-tenant environment; and more specifically, to a method and system for deploying metadata driven serverless functions in a multitenant environment.

BACKGROUND ART

A multi-tenant architecture is a type of computing architecture in which a single instance of a software application runs on a set of shared computing resources (e.g., a set of servers) and serves multiple customers that contract for services and/or compute resources from a provider of the multi-tenant architecture. The customers are referred to as tenants. Tenants may be given the ability to customize some parts of the applications for their own usage. Customizations can include basic things such as the color scheme of the user interface of the application or more complex items like customized business rules or component module configuration. Generally, tenants cannot customize the code of the shared application.

In a multi-tenant architecture, multiple instances of an application operate in a shared execution environment. Each tenant is integrated in use of physical hardware, but tenant specific data is separated. Thus, a single instance of the code of a software application will run on the hardware of a server and serve multiple tenants. This reduces the compute resources required relative to a multi-instance architecture where a separate instance of a software application is executed for each tenant. In some cases, a software application in a multi-tenant architecture can share a dedicated instance of configurations, data, user management and other properties. However, in other cases these aspects are not shared.

Multi-tenant software applications can share the users, interfaces, business rules, databases, and related aspects. However, tenants can customize these aspects and the users associated with each tenant can have varying access to these aspects such that certain users and certain tenants can have differing access to different aspects of the software applications and have permissions to customize some of these aspects.

Due to the complexity of the multi-tenant architecture, development for multi-tenant environments is similarly complex. A customer that seeks to develop a software application for execution in the multi-tenant architecture must have a detailed understanding of the operation of the multi-tenant architecture. The software applications are specialized and tailor fit to operating within the multi-tenant architecture, which requires a high level of knowledge of the multi-tenant architecture operating environment and is more time and manpower intensive to develop.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for deploying metadata driven serverless function in a polyglot serverless multi-tenant runtime. The multi-tenant architecture including the methods and apparatus enables developers to write and run domain driven code elastically without requiring that the developers understand the details of operating the serverless functions in the multi-tenant architecture. A 'serverless function' is a single-purpose programmatic function that is created by a tenant and hosted in the multi-tenant architecture. The implementations provide a serverless function that utilizes metadata about a function to deploy, secure, manage and integrate customer-developed code into a multi-tenant elastic runtime. An 'elastic runtime' is a framework that hosts software applications to be executed in the multi-tenant architecture or in conjunction with the multi-tenant architecture. The use of the metadata of the serverless function enables seamless integration into application that also consist of low-code or no-code (e.g., components created via graphical user interfaces) components. The implementations enable a tenant to develop a serverless function without having to design, implement, and support the serverless function to function in the specific elastic runtime or interact with the multi-tenant architecture.

Figure 1:
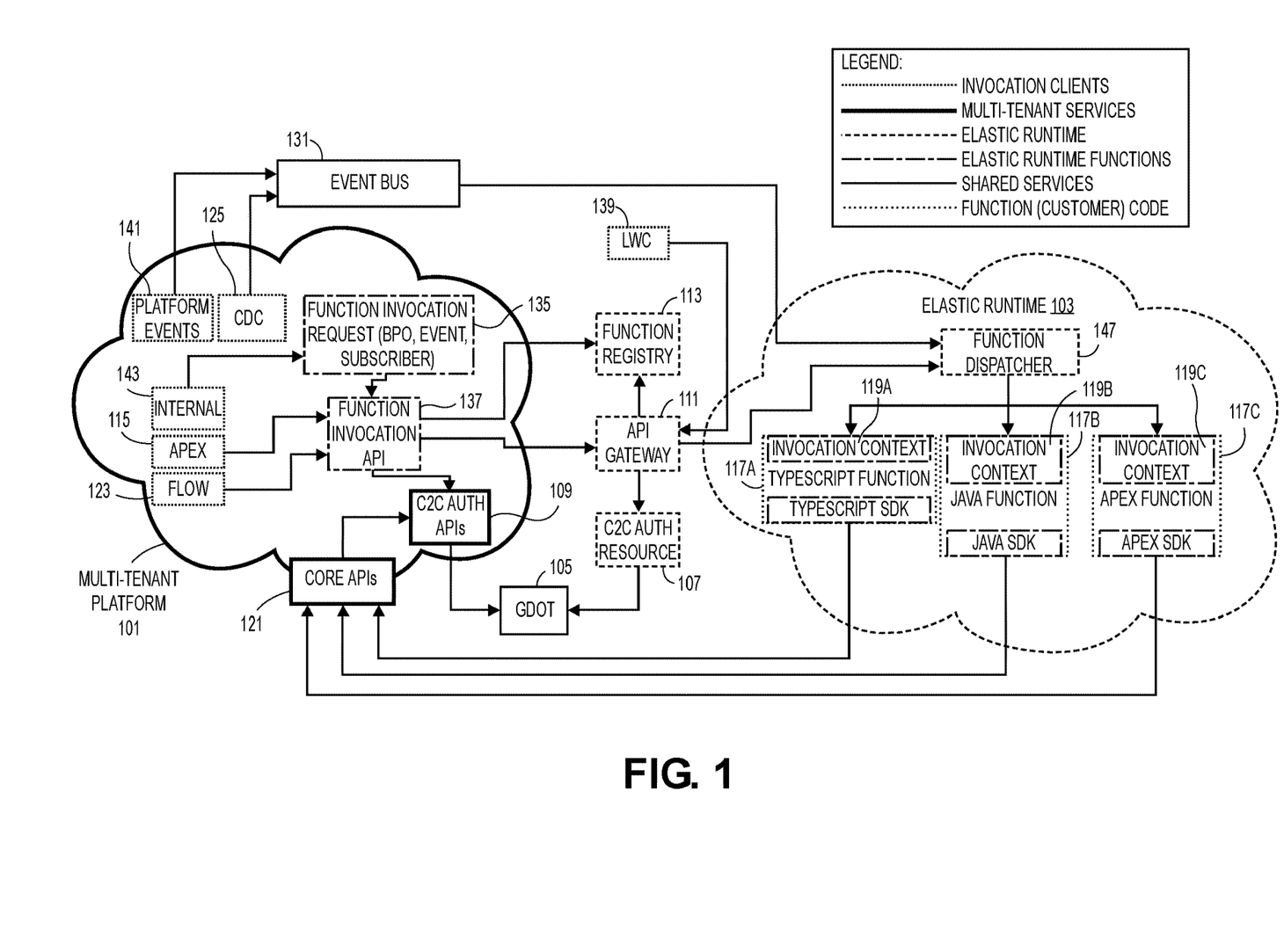
FIG. 1 is a diagram of an example implementation of a multi-tenant architecture and an elastic runtime architecture.

FIG. 1 is a diagram of an example implementation of a multi-tenant architecture and an elastic runtime architecture. The implementations support the development and deployment of serverless functions. Serverless functions enable developers to extend the capabilities of a low-code multi-tenant platform programmatically. Developers can use popular programming languages node.js, Java, or Apex), open source libraries, and similar programming tool. Serverless functions enable the developer to focus on delivering business logic rather than worrying about the underlying server architecture, service management, tenancy, and security. Serverless functions are stateless and execute without a predefined database transaction scope, allowing them to be scaled elastically to meet customer demand. Serverless functions can be built using software development kits (SDKs), which streamline interaction with the elastic runtime environment and multi-tenant architecture including constituent data models and application programming interfaces (APIs). Serverless functions are developed independently of their triggering mechanism, allowing the serverless functions to be invoked in a variety of ways such via hypertext transfer protocol secure (HTTP)/representational state transfer (REST), remote procedure call (RPC), or Platform Events. Declarative tools such as a flow builder or application builder can support serverless function invocation natively, allowing low and no-code developers to seamlessly integrate their capabilities.

The implementations for serverless function generation and deployment described herein enable developers to focus solely on writing the business logic of the serverless function. The developer does not need to code or maintain infrastructure code such as authentication, security, web stacks, platform integration, or multitenancy. Serverless functions are polyglot so developers can use any programming language, e.g., Java or Apex, as well as leverage skills, open source libraries, and tools that they may already be familiar with from other development languages. The implementations described herein support languages such as JavaScript (TypeScript/Node.js), Java, APEX, and other programming languages. Implementations can support any type or combination of development environment for creating the serverless functions. The development environment can vary depending on the language that is utilized or the preferences of the developer. Serverless functions can be scaled elastically by the developer based on the need for use of centralized monitoring and management user interfaces (UIs) and APIs. Serverless functions can be tightly integrated for low-code features such as flow building, process building, platform events, and light weight code as well as high code features based on higher level programming language.

The serverless function source code exists alongside other application source code in a developer workspace. Developers can use development environments (e.g., VS Code) and command line interfaces (CLIs) to create shells of new serverless functions, writing code, testing locally, and supporting continuous integration. Alternatively, serverless functions can be generated based on function code. An invocation context is passed into the function which includes the parameters for an API along with user context, security context, and customer specific domain type information. This information can be fed into the SDKs, which allow the developer to access key multi-tenant platform capabilities such as executing object query language (OQL) queries, performing create, read, update, and delete (CRUD) operations on data entities, or generating new platform events.

The function code of a serverless function is independent of the particular triggering mechanism. The server function is focused on implementing an interface of immutable inputs and immutable outputs. The triggering mechanism for the functions are specified in configuration, and for simple cases such as a direct HTTPS/REST invocation or responding to a platform event the transformation and subscription can be handled automatically by the development framework. A developer is also able to use the data languages and tools to build complex orchestrations across multiple sources and functions. The triggers can be expanded as functions mature adding capabilities such as publication and subscription events or even database triggers.

Example Architecture

The elastic runtime 103 and multi-tenant architecture 101 shown in FIG. 1 is focused on providing an improved developer experience based on the capabilities of the architecture. The elastic runtime 103 hosts the services supporting serverless functions and executes the serverless functions as well. In some implementations, the elastic runtime 103 can provide control over data residency and locality based on the tenant's location and needs.

The architectural components support platform events integration where high-scale delivery of events can be used to trigger serverless functions in the elastic runtime 103. In addition, change data capture (CDC) 125 and platform events 141 are other ways events are delivered to functions. The function dispatcher 147 subscribes to the event bus 131 to trigger functions based on receiving the CDC and platform events. The architectural components can support function invocation request 135 where a standard object, which can be used by multi-tenant platform developers (i.e., where the multi-tenant platform developers write internal code 143) to invoke a serverless function. The standard object provides a mechanism for passing input parameters, monitoring state of the invocation, and storing any return values. Both synchronous and asynchronous invocations are supported and managed through a base platform object (BPO). When new records are inserted a standard platform event and shared subscriber are used to initiate the callout via a function invocation API 137 to the serverless function. The function invocation API 137 can also be utilized by the platform capabilities (e.g., Apex 115 and Flow 123) to callout to the serverless function. The architectural components can include a global directory of tenants (GDOT) 105, which is a service used to declare and validate trust between tenants and services in Cloud to (loud (C2C) Authentication (AuthN) and Authorization (AuthZ) flows. C2C Auth APIs 109 are APIs provided by C2C which are used to generate tokens passed to the serverless function for service and user AuthZ/AuthN. The C2C Auth APIs 109 are also used by the core APIs to establish sessions based on incoming C2C tokens.

A C2C Auth Resource 107 of the elastic runtime 103 is a service for managing elastic runtime "tenants" in GDOT 105 and generating validation C2C tokens on their behalf. The API Gateway 111 exposes secure API endpoints for triggering functions, such as HTTPS/REST interfaces. For C2C integrations between the multi-tenant platform 101 and the elastic runtime 103 the API gateway 111 can use C2C Auth Resource 107 to validate tokens on incoming requests and mint user tokens for accessing the multi-tenant platform APIs.

The function registry 113 is a centralized registry of metadata about deployed serverless functions and the configured triggering mechanisms (e.g., based on an AnyPoint Exchange or similar technology). In some implementations, a function substrate is used to run multi-tenant platform functions, such as Apex functions 115 and serverless functions 117A-C for other polyglot functions. The function substrate can meter the serverless function invocations and serves as a point of control over serverless functions, determining which customer is authorized to access the serverless functions, and to log all transactions. The function substrate can apply runtime policies to enforce governance like rate limiting, throttling and caching. The function substrate can enforce tenancy so that a single serverless function can service multiple tenants of the multi-tenant platform 101.

A serverless function 117A-C is a tenant/customer developed business logic. An invocation context 119A-C is provided for each serverless function 117A-C, which includes the parameters fulfilling the API contract as well as user and security context. Each serverless function 117A-C also includes a software development kit (SDK) that allows the developer to access key multi-platform 101 capabilities such as executing structured query language (SQL) queries, perform CRUD operations on data entities, or initiating new platform events. Developers can use strongly typed objects which are driven by metadata for implementation of their functions. The SDK also exposes enhanced APIs that layer atop the multi-tenant platform APIs to provide fluent development (i.e., simplified development and testing) and transactional support (e.g., a UnitOfWork API).

Multi-tenant platform integration provides that serverless functions can be triggered from existing multi-tenant platform capabilities such as flows 123, Apex 115, platform events 141 or change data capture (CDC) 125 events. The exposure of serverless functions to these mechanisms is automatic without any further configuration needed by the administrators of the multi-tenant platform. Administrators are able to configure and manage serverless functions in a manner consistent with the rest of the Multi-tenant platform 101. In some implementations a lightning web components (LWCs) 139, which are browser based user interface components that can invoke serverless functions are supported.

Figure 2:
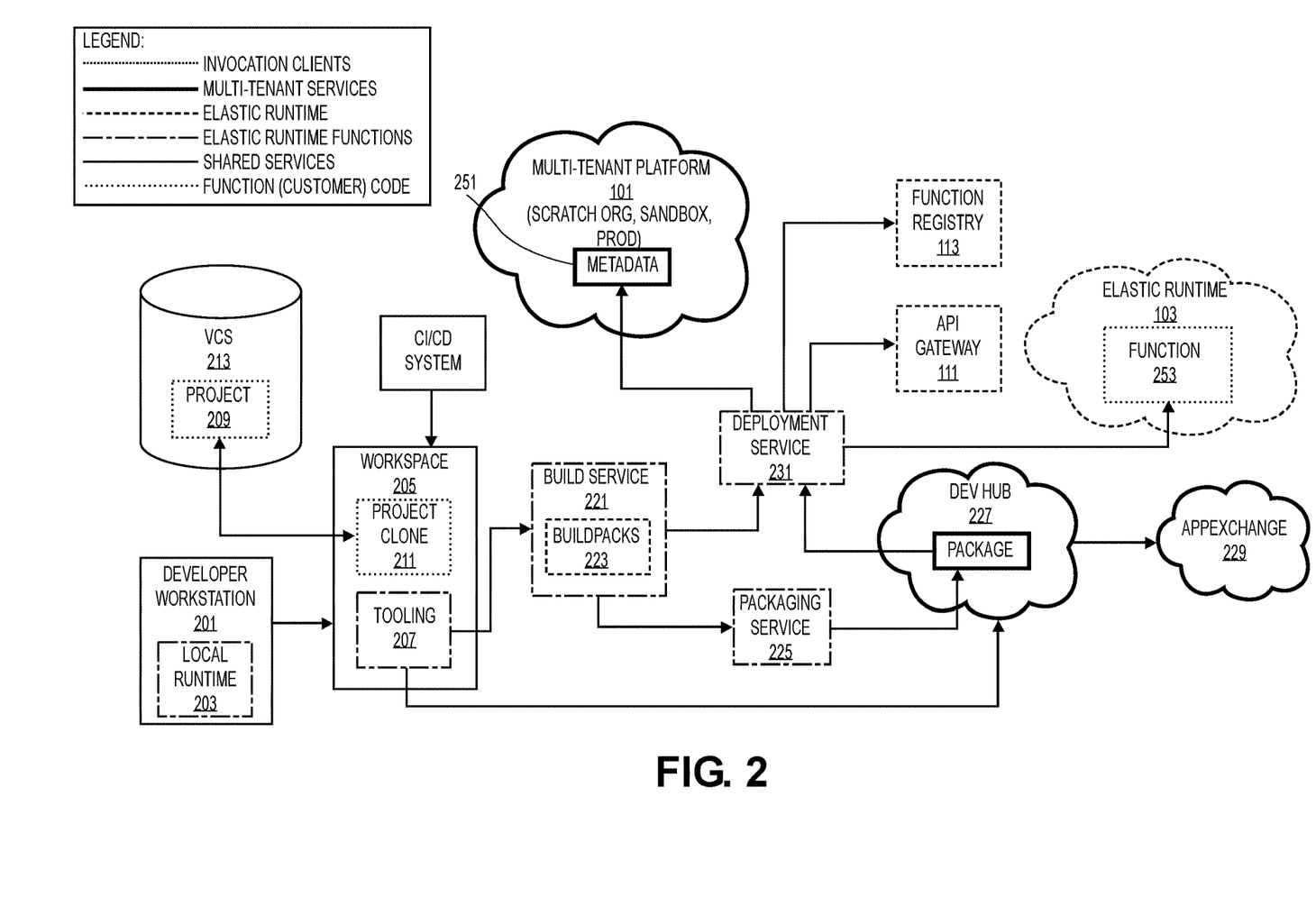
FIG. 2 is a diagram of one example implementation of an architecture for deployment of serverless functions.

FIG. 2 is a diagram of one example implementation of an architecture for deployment of serverless functions. The illustrated implementation includes the multi-tenant platform 101 and elastic runtime 103 as described herein. The example implementation also illustrates the infrastructure for deploying serverless functions into the elastic runtime 103 that can interact with the multi-tenant platform 101.

The components of the development and deployment infrastructure include tooling component 205 that provides CLI and VSCode support for building, deploying, and debugging serverless functions along with other components. A project 209 is multi-tenant platform related source code that is stored and accessible via version control software (VCS) 213 or similar storage and/or project control software in communication with a workspace 205 that can host a copy or clone of the project 211. This workspace 205 along with the components hosted by the workspace can be accessed by a developer (e.g., a tenant developer) via a developer workstation 201.

The developer workstation 201 can execute a local runtime 203. The local runtime 201 is a lightweight emulation of the elastic runtime 103 that enables testing and creation of serverless functions. The developer can use the local runtime 203 to locally test and debug the serverless functions. Triggers for the serverless function can be simulated using the CLI. 'Scratch' organizations and similar testing context information can be used to locally test integrations and SDK invocations for serverless functions at the developer workstation 201 using the local runtime 203.

Once a serverless function has been completed and tested, a build service can take platform source code 211 in a workspace 205 and performs appropriate build operations for the various platform components to prepare the serverless function for deployment. The build services outputs a buildpack that includes the serverless function and related metadata amongst other information. A deploy service 231 receives the buildpack and performs deployment operations for the various built platform components including installing metadata 251 into the multi-tenant platform 101 and the serverless function 253 into the elastic runtime 103. The metadata defines the interfaces, calls, triggers, event handling, and similar mechanisms by which the components of the multi-tenant platform 101 can access the serverless function 253 in the elastic runtime 103. The deployment service 231 deploys and configures exposure and secure connections for the appropriate substrate (e.g., Apex, elastic runtime for polyglot such as Java or Node.js). Serverless function metadata 251 is deployed to the function registry 113 of the elastic runtime 101 HTTPS/REST endpoints or similar interfaces are registered with the API Gateway 111. Core metadata within the metadata 251 is deployed to the appropriate org-based environment of the multi-tenant platform 101, including references to the serverless functions 253.

In some implementations, continuous integration (CI)/continuous delivery (CD) integration support is provided, where the workspace CU and elastic runtime APIs can be integrated into CI/CD tools 261 (e.g., Circle CI, GitHub CI, Jenkins, and Spinnaker). A remote build service can be utilized for streamlined and secure CI/CD when custom implementations are not needed.

The serverless functions 253 are deployed, tested, and promoted through a series of environments corresponding to steps in a software development life cycle (SDLC) including development, test, stage, and production. Separating out the deployment environments allows testing with corresponding deployment environments such as internal test environments, scratch, organizations, sandboxes, and production organizations.

The serverless function buildpacks 223 can be cloud-native buildpacks that are used to build and deploy serverless functions. In addition to standard buildpacks developers are able to create additional specialized buildpacks for unique needs, such as a Chromium/Puppeteer buildpack used for PDF rendering. A packaging service 225 takes platform source and packages it for installation and listing on an application exchange 229. A developer hub 227 enables administration of development configuration such as namespace and developer permissions. The developer hub 227 can provide storage for build packages. An application exchange 229 is a marketplace for developers and tenants to list their multi-tenant platform 101 applications for use by other tenants.

Figure 3:
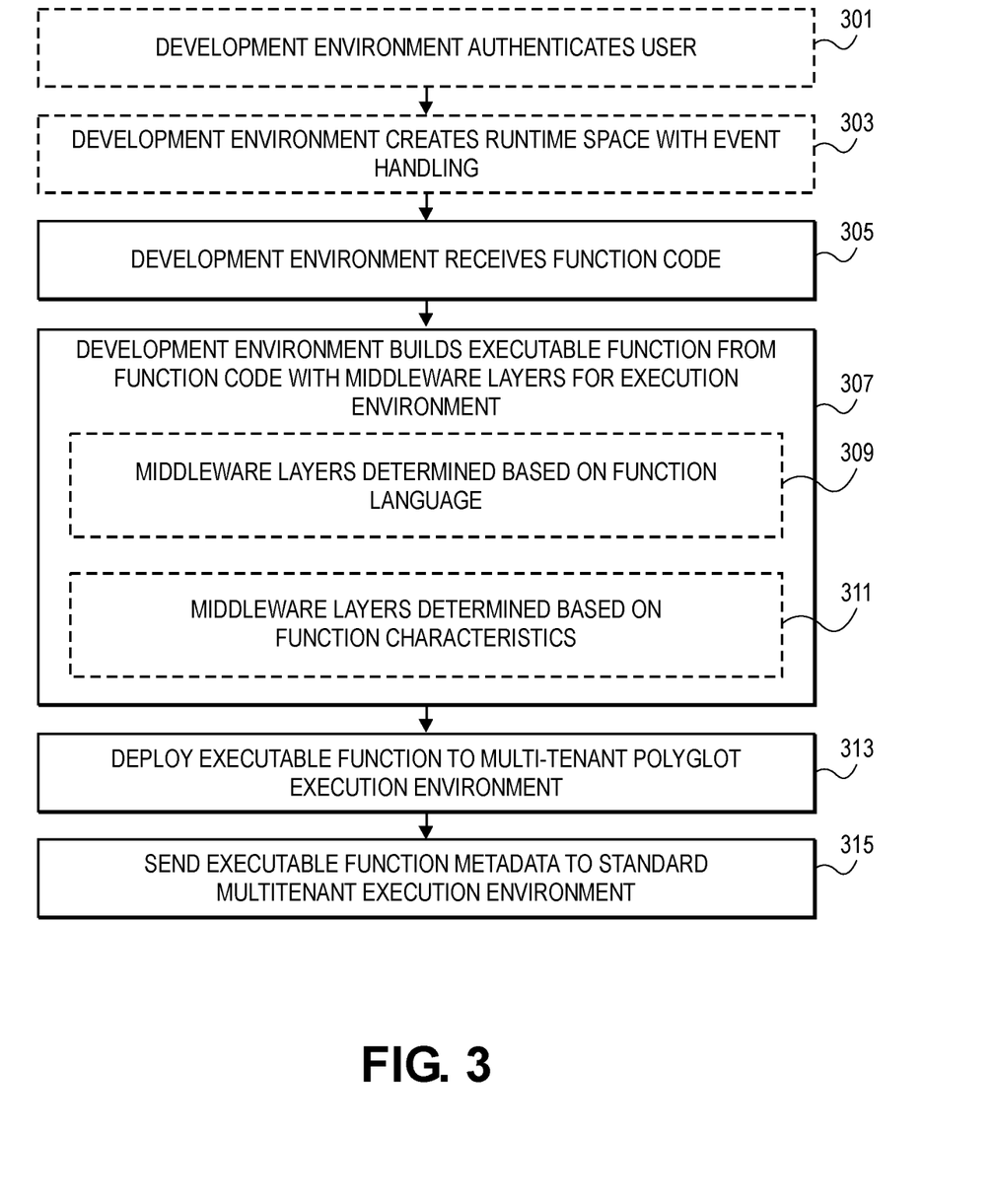
FIG. 3 is a flowchart of one example implementation of a process for serverless function deployment.

FIG. 3 is a flowchart of one example implementation of a process for serverless function deployment. The process begins in a development environment (e.g., implemented at a developer workstation) where the developer (i.e., a user) authenticates with the development environment and workspace (Block 301). The authentication ensures that the user has permissions to create, build, and test, as well as, deploy, serverless functions in the system. After the user is authenticated, the development environment can generate a local runtime space (Block 303). The local runtimes spaces is a version of the elastic runtime where the serverless function is to be deployed. The local runtime space can have limited capabilities, but sufficient for testing and debugging the serverless function. In some implementations, the capabilities can include event handling support. The user utilizes this development environment and the local runtime space to generated and input function code to define the logic of the serverless function (Block 305). The function code can be defined in any programming language (e.g., Java, Apex, or similar language).

When the function code is complete or in condition to be tested or debugged, the development environment builds an executable function from the function code (Block 307). Building the executable function includes adding middleware layers for the execution environment (i.e., the elastic runtime). The added middleware layers correlate with the programming language utilized (Block 309) and the characteristics of the function (Block 311). An SDK layer correlated with the function code language can be added to the executable function. Similarly, an invocation context correlated with the characteristics of the function can be added. For example, where the serverless function interacts with events or similar data, interfaces and configuration information for handling events can be built into the serverless function.

When the executable function is built, it can be forwarded to a build services or similar components including a deployment service to be installed in the elastic runtime (Block 313). Metadata for the serverless function can be separately forwarded to the build service or deployment service to be installed to the multi-tenant platform to configure the interfaces between the serverless function and the components of the multi-tenant platform (Block 315).

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 4A:
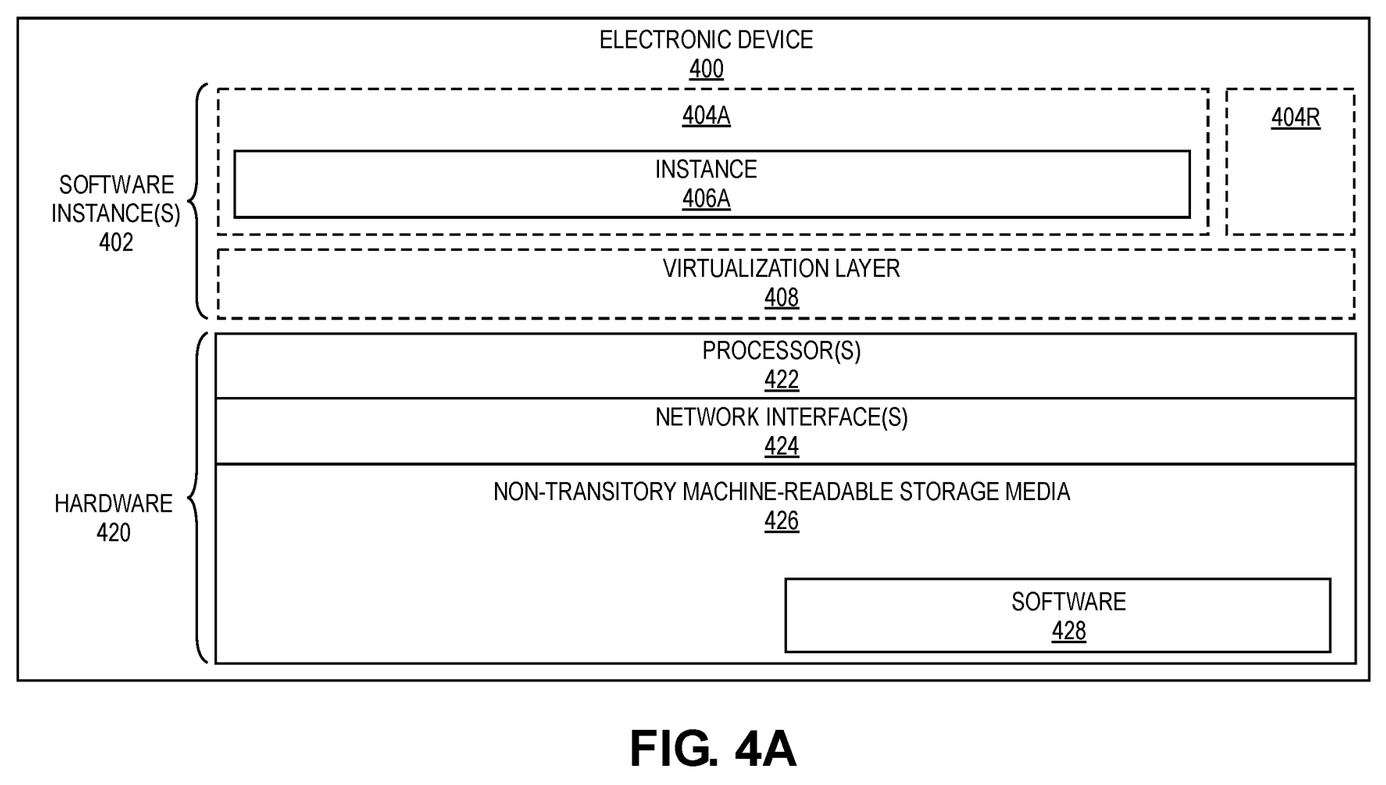
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and non-transitory machine-readable storage media 426 having stored therein software 428 (which includes instructions executable by the set of one or more processor(s) 422). The previously described development environment, deployment service and the multi-tenant platform and elastic runtime services may be implemented in one or more electronic devices 400. In one implementation: 1) each of the end user clients is implemented in a separate one of the electronic devices 400 (e.g., in user electronic devices operated by users where the software 428 represents the software to implement end user clients to interface with the developer environment; 2) the build service and deployment service are implemented in a separate set of one or more of the electronic devices 400 (e.g., a set of one or more server electronic devices where the software 428 represents the software to implement the build and/or deployment service); and 3) in operation, the electronic devices implementing the end user clients and the developer environment would be communicatively coupled (e.g., by a network) and would establish between them (or through one or more other layers) connections for submitting function code to the build service and deployment service and returning an acknowledgment to the end user clients. Other configurations of electronic devices may be used in other implementations (e.g., an implementation in which the end user client and the build service and/or the deployment service are implemented on a single electronic device 400).

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

Exemplary Environment

Figure 4B:
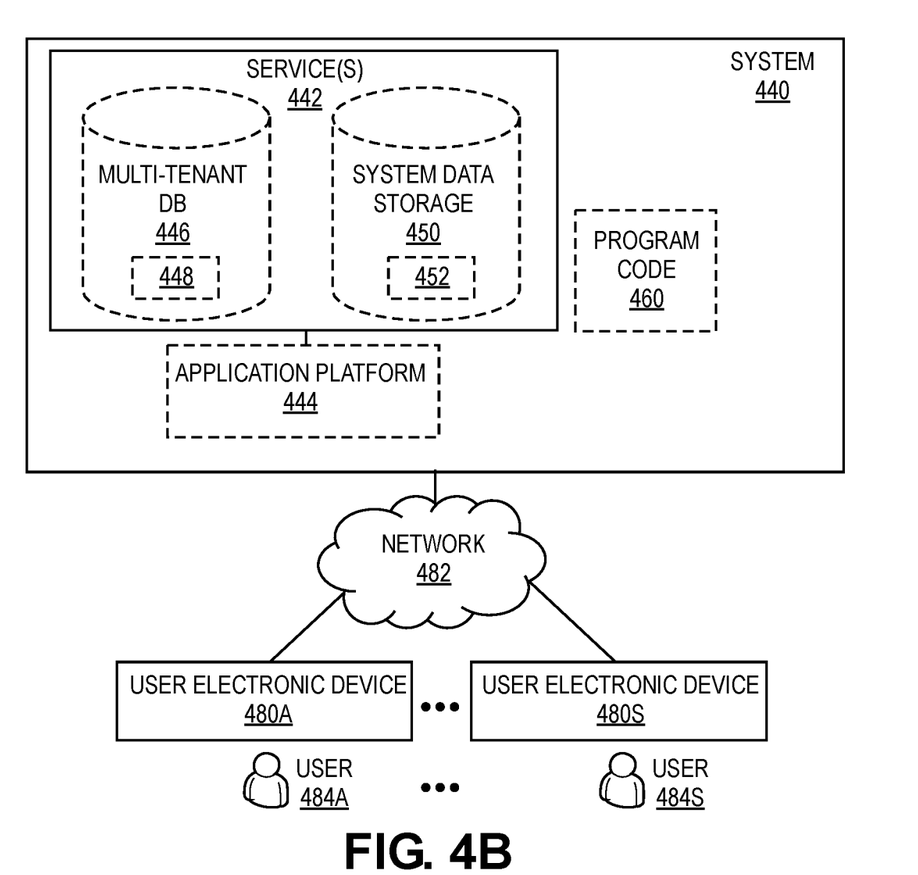
FIG. 4B is a block diagram of an environment where a developer environment, build service, or deployment service may be executed, according to some implementations.

FIG. 4B is a block diagram of an environment where a developer environment, build service, or deployment service may be executed, according to some implementations. A system 440 includes hardware (a set of one or more electronic devices) and software to provide service(s) 442, including the developer environment, build service, or deployment service. The system 440 is coupled to user electronic devices 480A-S over a network 482. The service(s) 442 may be on-demand services that are made available to one or more of the users 484A-S working for one or more other organizations (sometimes referred to as outside users) so that those organizations do not need to necessarily be concerned with building and/or maintaining a system, but instead makes use of the service(s) 442 when needed (e.g., on the demand of the users 484A-S). The service(s) 442 may communication with each other and/or with one or more of the user electronic devices 480A-S via one or more Application Programming Interface(s) (APIs) (e.g., a Representational State Transfer (REST) API). The user electronic devices 480A-S are operated by users 484A-S.

In one implementation, the system 440 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 440 may include an application platform 444 that enables PAAS for creating, managing, and executing one or more applications developed by the provider of the application platform 444, users accessing the system 440 via one or more of user electronic devices 480A-S, or third-party application developers accessing the system 440 via one or more of user electronic devices 480A-S.

In some implementations, one or more of the service(s) 442 may utilize one or more multi-tenant databases 446 for tenant data 448, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user electronic device 480A-S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the one or more multi-tenant database 446 and/or system data storage 450.

In some implementations, the service(s) 442 are implemented using virtual applications dynamically created at run time responsive to queries from the user electronic devices 480A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the developer environment, build service, or deployment service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 440 and the user electronic devices 480A-S.

Each user electronic device 480A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 440. For example, the user interface device can be used to access data and applications hosted by system 440, and to perform searches on stored data, and otherwise allow a user 484 to interact with various GUI pages that may be presented to a user 484. User electronic devices 480A-S might communicate with system 440 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 480A-S might include an HTTP client, commonly referred to as a "browser," for sending and receiving HTTP messages to and from server(s) of system 440, thus allowing users 484 of the user electronic device 480A-S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for deploying a function in a polyglot serverless elastic runtime execution environment, the method comprising:
   receiving, by a build service, a function code from a development environment;
   combining, by the build service, the function code with middleware layers for polyglot serverless elastic runtime execution environment to form an executable function for the polyglot serverless elastic runtime execution environment;
   deploying, by a deployment service, the executable function to the polyglot serverless elastic runtime execution environment; and
   forwarding, by the deployment service, metadata for the executable function to a standard multitenant execution environment separate from the polyglot serverless elastic runtime execution environment, the metadata to enable invocation of an instance of the executable function from the standard multitenant execution environment by applications of a plurality of tenants of the multi-tenant execution environment.

2. The method of claim 1, further comprising:
   generating a local runtime space with event handling to support development of the function code.

3. The method of claim 1, wherein the middleware layers include invocation control.

4. The method of claim 3, wherein the invocation control enables the executable function to be called by software in a standard multitenant execution environment.

5. The method of claim 1, wherein the middleware layers include a language specific interface to access application programming interfaces (APIs) of a standard multitenant execution environment.

6. The method of claim 5, further comprising:
determining the language specific interface added in the middleware layers by identifying a language of the function code.

7. A non-transitory machine-readable storage medium that provides instructions that, if executed by a processor, will cause said processor to perform operations to deploy a serverless function in a polyglot serverless elastic runtime execution environment, the operations comprising:
receiving, by a build service, a function code from a development environment;
combining, by the build service, the function code with middleware layers for polyglot serverless elastic runtime execution environment to form a executable function for the polyglot serverless elastic runtime execution environment;
deploying, by a deployment service, the executable function to the polyglot serverless elastic runtime execution environment; and
forwarding, by the deployment service, metadata for the executable function to a standard multitenant execution environment separate from the polyglot serverless elastic runtime execution environment, the metadata to enable invocation of an instance of the executable function from the standard multitenant execution environment by applications of a plurality of tenants of the multi-tenant execution environment.

8. The non-transitory machine-readable storage medium of claim 7, having further instructions that if executed by the processor to cause the processor to perform operations comprising:
generating a local runtime space with event handling to support development of the function code.

9. The non-transitory machine-readable storage medium of claim 7, wherein the middleware layers include invocation control.

10. The non-transitory machine-readable storage medium of claim 9, wherein the invocation control enables the executable function to be called by software in a standard multitenant execution environment.

11. The non-transitory machine-readable storage medium of claim 7, wherein the middleware layers include a language specific interface to access application programming interfaces (APIs) of a standard multitenant execution environment.

12. The non-transitory machine-readable storage medium of claim 11, having further instructions that if executed by the processor to cause the processor to perform operations comprising:
determining the language specific interface added in the middleware layers by identifying a language of the function code.

13. A computer system to execute a method for deploying a function in a polyglot serverless elastic runtime execution environment, the computer system comprising:
a non-transitory machine-readable storage medium having stored therein a build service and a deployment service; and
a processor coupled to the machine-readable storage medium, the processor to execute the build service, the build service to receive function code via a development environment, and to combine the function code with middleware layers for polyglot serverless elastic runtime execution environment to form an executable function for the polyglot serverless elastic runtime execution environment, the deployment service to deploy the executable function to the polyglot serverless elastic runtime execution environment, and forward metadata for the executable function to a standard multitenant execution environment separate from the polyglot serverless elastic runtime execution environment, the metadata to enable invocation of an instance of the executable function from the standard multi-tenant execution environment by applications of a plurality of tenants of the multi-tenant execution environment.

14. The computer system of claim 13, wherein the build service is further to generate a local runtime space with event handling to support development of the function code.

15. The computer system of claim 13, wherein the middleware layers include invocation control.

16. The computer system of claim 15, wherein the invocation control enables the executable function to be called by software in a standard multitenant execution environment.

17. The computer system of claim 13, wherein the middleware layers include a language specific interface to access application programming interfaces (APIs) of a standard multitenant execution environment.

* * * * *